July 23, 1963 L. R. IVEY 3,098,465
DOG CAGE

Filed Oct. 3, 1962 2 Sheets-Sheet 1

INVENTOR.
Lee R. Ivey
BY
Dudley B. Howard
Attorney

July 23, 1963  L. R. IVEY  3,098,465
DOG CAGE
Filed Oct. 3, 1962  2 Sheets-Sheet 2

INVENTOR.
Lee R. Ivey
BY
Dudley B. Howard
Attorney

United States Patent Office 3,098,465
Patented July 23, 1963

3,098,465
DOG CAGE
Lee R. Ivey, Morristown, N.J., assignor to Lab-Crafts Inc., Morristown, N.J., a corporation of New Jersey
Filed Oct. 3, 1962, Ser. No. 228,076
5 Claims. (Cl. 119—15)

This invention relates in general to cages for use in research laboratories or in veterinary hospitals to house small animals such as dogs, and has particular reference to cages of the type that have means incorporated therein for the evacuation of feces and collection of urine samples for the purpose of urinalysis.

For some time prior to my present invention, a type of cage has been available to research laboratories that is equipped with a removable pan shaped like a broad, flatly-pitched funnel with a downspout near the center. This funnel-shaped pan is used for the purpose of collecting the dog's urine when metabolism studies are being conducted. The dog lives on a grating floor an inch or so above the top edge of the removable pan. The grating usually catches and holds the dog's feces while letting the urine run down into the pan and through the downspout into any acceptable type of receiving vessel.

Unlike the various species of rodents, the dog has a normal feces so large in proportion to the size of its feet that it is very difficult to choose a grating spacing that will allow the feces to drop through and at the same time be reasonably well spaced for the dog's feet to be supported comfortably thereby. This means that the dog walks in his own feces and makes quite a mess which has to be cleaned up at frequent intervals. Consequently, considerable manpower is expended in removal of the gratings and pans for cleaning.

More recently, a new type of cage was developed which eliminated the removable grating and pan and substitutes a built-in sheet metal floor which slopes downwardly slightly toward the rear of the cage and extends out two or three inches through a horizontal slot in the back. Feces and urine can be flushed out easily into a metal trough, or gutter, running along the building wall behind a row of such cages. The floor of the cage protrudes from the back of the cage far enough to overhang this trough. However, this cage arrangement does not permit the collection of urine samples. If a removable pan were to be hung in the rear to catch the urine, it would be necessary to pull the cage forward to install the pan and to move the cage again to remove the pan. Any system of tubes to conduct the urine samples forward into a receiver at the front of the cage would be undesirable because of the extra cleaning problems created. Also, it is desired to keep to a minimum the surfaces wetted with the urine in order to avoid loss of urine through evaporation of the film which becomes spread over the wide surfaces of the sheet metal floor.

With the above enumerated disadvantages of the prior art dog cages in mind, it is the primary object of the present invention to provide an improved cage which combines with the desirable excreta flush-out features of the prior art cages effective means by which urine samples suitable for urinalysis may be taken at appropriate times.

To be more explicit, I utilize the prior art construction of built-in floor that has a widely spread rear edge portion projecting through a slot in the rear wall of the cage to provide a highly satisfactory wash-over lip which will overhang the wall gutter and effectively direct excreta into the latter when a hose or other means is employed to flush the floor from front to rear. To this construction, I have added a downspout which projects obliquely rearward from the lowest point of the protruding rear portion of the floor, somewhat like the pouring lip of a pitcher, so that, when the dog urinates, a very small narrow flow of urine will be discharge through the downspout for collection by a sample receiver which has been moved rearward to a position beneath said downspout by a slide which may be moved manually from front to rear on a track provided for its support and guidance.

Further objects, advantages and features of the invention will become apparent as the following specific description is read in connection with the accompanying drawings, in which.

Figure 1:
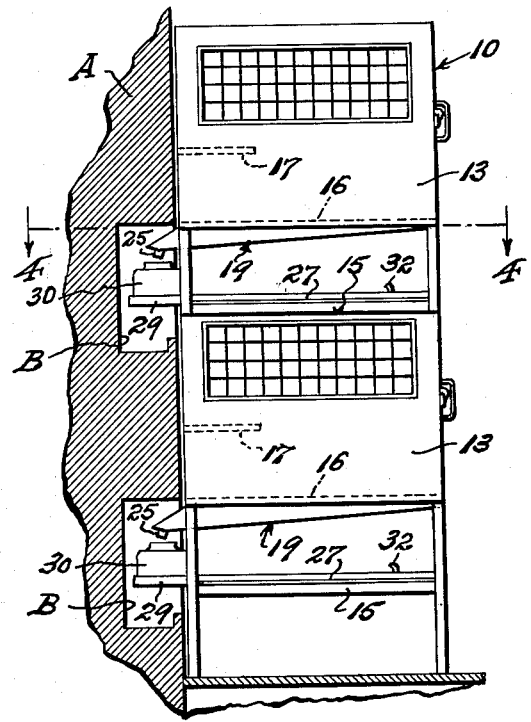
FIG. 1 is a small-scale side elevational view of a two-unit tier of cages constructed in accordance with the invention, showing the same mounted in operative relation to the wall gutter of a room.
Figure 2:
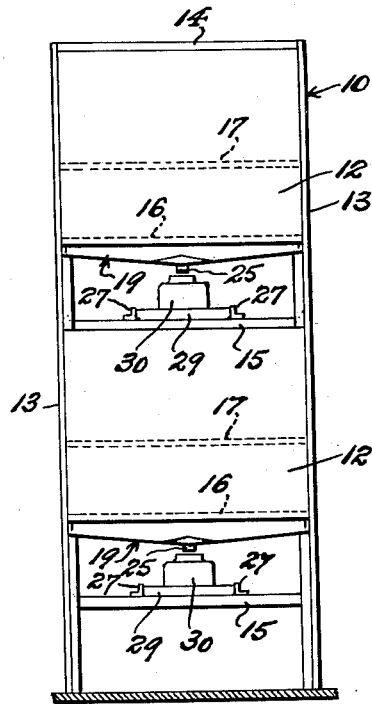
FIG. 2 is a rear elevation of the same, showing urine sample receivers in operative position beneath the downspouts of the drain floors.
Figure 3:
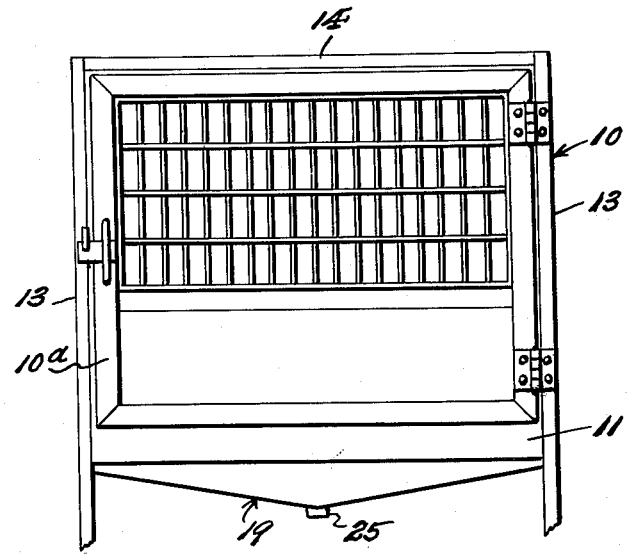
FIG. 3 is a fragmentary front elevation of one of the cage units, drawn on an enlarged scale.

Referring now in detail to the drawings, wherein like reference characters designate corresponding parts in the several views, there has been disclosed for the purpose of illustration an embodiment of the invention which comprises a tier of two dog cages, but it is to be understood that the novel features thereof are contained in each cage unit itself, regardless of whether it is a single unit or combined with other cages in tiers or horizontal rows. In any event, it will be the practice to mount the cage or cages close to the wall A of a room which is provided with drainage gutters B running along the same at levels coordinated with the excreta flushing elements of the respective cages, as will become more clear as the description progresses.

Each cage comprises a body element 10 including front wall 11, back wall 12, side walls 13—13, top wall 14 and bottom wall 15, all of which confine an animal and tend to prevent spread of contagious diseases between adjacent animals. A door 10a is provided at the front of body element 10 to permit access to the interior for all usual purposes.

Incidentally, although my cage has been designed specifically for the confinement of dogs undergoing research tests, it is to be understood that this is not the only application of the invention. The cage construction now to be disclosed may be used for cats and other small animals in research laboratories, animal hospitals, and various other places.

Each cage body element 10 has an interiorly located horizontal floor grating 16 located at a sufficient distance below top wall 14 to permit a dog to stand upon it comfortably. Close above the rear end of floor grating 16, a perch 17 is mounted in a level position to support a dog that has been required to jump up on it just prior to the commencement of flushing operations so that he will not get wet. The ends of perch 17 may be secured in suitable manner to side walls 13—13, but it is preferred to rest floor grating 16 loosely upon brackets 18, so that it may be removed for cleaning, when necessary, more thoroughly than can be done by the usual flushing operation.

Figure 4:
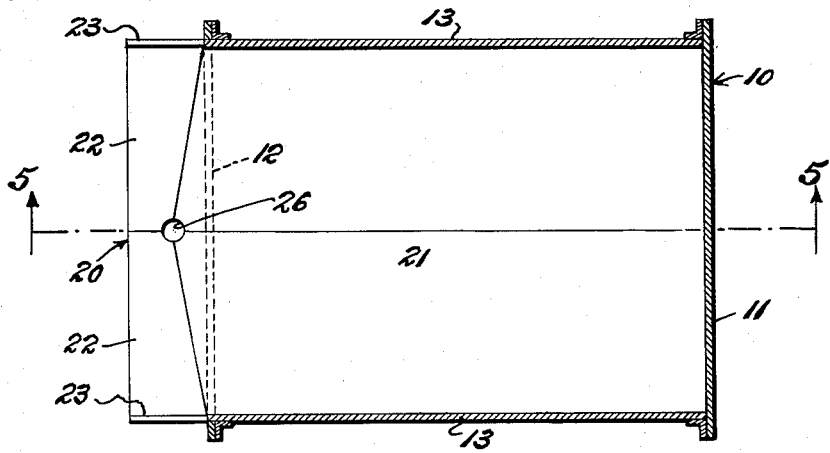
FIG. 4 is a large-scale horizontal section taken on line 4—4 in FIG. 1.

An excreta flushing element is built into the cage directly below floor grating 16 and preferably has the form represented in FIGS. 4 and 5, which may be described as that of a flatly-pitched funnel-like drain floor 19. In plan view (FIG. 4), drain floor 19 is substantially rectangular and equal in width to the spacing between side walls 13—13, and is two or three inches longer than the spacing between front wall 11 and rear wall 12 to allow for projection of a wash-over lip 20 rearwardly outward from the cage through a transversely elongated evacuation slot E in back wall 12. Drain floor 19 is mounted in cage body element 10 by suitable supporting means with its rear end slightly lower than its front end, and preferably is formed from sheet metal, such as stainless steel, by die stamping in a power press or press brake, to give it to the peculiar shape shown. The bottom wall 21 of drain floor 19 is flat from its front end clear through the cage to its lowest point, which is located just outside the back wall 12. From a transverse line located substantially at back wall 12, side portions, or wings, 22 merge wtih bottom wall 21 and are inclined upward at a very slight angle to the horizontal to form wash-over lip 20.

Both side walls 13—13 of cage body element 10 are united to the side edges of bottom wall 21 of drain floor 19 in a water-tight joint. Moreover, side walls 13—13 are provided with triangular extensions 23—23 that protrude beyond back wall 12 and are united with wings 22 in a water-tight joint to complete the general funnel-like form of drain floor 19. It is an important feature of my invention that the form and inclination of wash-over lip 20 shall be such that water hosed from front to rear against the upper surface of drain floor 19 will meet low resistance and thus flow smoothly and the efficient flushing action from said floor into the wall gutter B in rear of the cage. This action is essential to the evacuation of feces and urine film in general.

It will be noted that an angular reinforcing member 24 is secured suitably, as by welding or brazing, to wash-over lip 20, laterally coextensive therewith. This reinforcing member 24 is located underneath wings 23—23 of drain floor 19 in a position which will not cause undesired turbulence in the stream of flushing water.

Added to the excreta flushing element just described is a coordinated urine collection element to provide for selective collection of urine samples for urinalysis at appropriate times separate from flushing operations. This additional element includes a downspout 25 that is joined in suitable manner, as by welding or brazing, to drain floor 19 at its lowest point and communicates with its interior through a discharge hole 26 which is cut through said floor. Downspout 25 is located outside back wall 12 of cage body element 10 and is inclined rearwardly at a slight angle from the vertical for registration with the wall gutter B and also with urine sample receiver means to be described presently.

Beneath drain floor 19, a front to rear track is mounted on the bottom wall 15 by parallel, horizontal side rails 27—27. Bottom wall 15 is supported preferably by angle brackets 28 affixed to the respective front and back walls 11 and 12 of cage body element 10. Track 27 is located in a position to underlie downspout 25, and serves to guide a slide 29 in movement between the operative position represented in solid lines in FIG. 5, wherein a urine sample receiver 30 seated at the rear end of said slide will be directly beneath and in registration with downspout 25, and the inoperative position shown in broken lines wherein the said receiver may be retrieved from the cage for urinalysis purposes. A depressed seat, or pocket, 31 to fit and stabilize sample receiver 30 is formed at the rear end of slide 29, and a handle 32 is provided at the front end of the latter.

*Operation*

When it is necessary to flush fecal matter and urine from floor grating 16 and drain floor 19, door 10a is opened and the dog, if there be one in the cage, is caused to jump up onto perch 17. Then, a water hose is introduced and directed toward the surfaces to be flushed. When the water is turned on it will cause a strong flushing stream to penetrate the interstices of floor grating 16 and pour rearward over the entire upper surfaces of drain floor 19 to evacuate feces and urine over wide lip 20 as well as through downspout 25 into wall gutter B.

Figure 5:
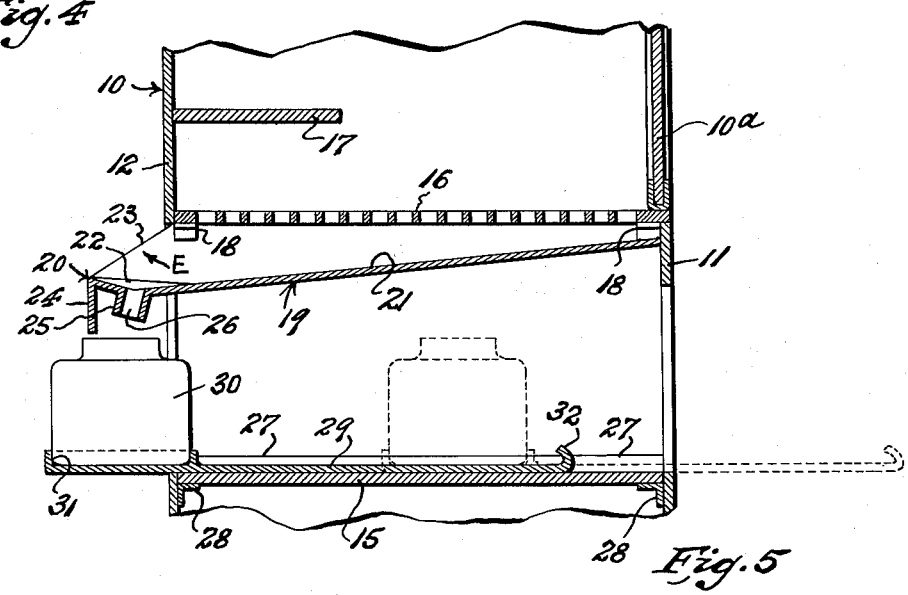
FIG. 5 is a vertical section taken on line 5—5 in FIG. 4.
Figure 6:
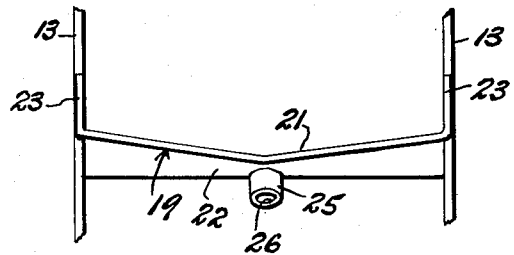
FIG. 6 is a detail rear elevation of the drain floor alone, partially broken away and without the reinforcing member.

At other times, when a urine sample suitable for urinalysis can be obtained, a clean sample receiver 30 is mounted in seat 31 of slide 29 and pushed rearward into the operative position shown in solid lines in FIG. 5, wherein it is located beneath and in registration with downspout 25. After the sample has been obtained, slide 29 is moved forward into the inoperative position shown in broken lines and receiver 30 is retrieved for dispatch to the laboratory.

While the invention has been illustrated and described with respect to a particular embodiment thereof, it will be understood that it is intended to cover all changes and modifications of the embodiment shown which do not constitute departures from the spirit of the invention and scope of the appended claims.

I claim:
1. An animal cage comprising:
   a body element including front, back, side, bottom and top walls, of which the back wall has a transverse evacuation slot for alignment with a gutter forming part of the wall of a building in which the cage is installed;
   an excreta flushing element in the form of a rearwardly tilted broad flatly-pitched funnel-like drain floor having a substantially level rear edge portion projecting through the back wall evacuation slot of the cage body element and provided with bottom drainage surfaces that slope toward the lowest point of said drain floor, which point is located outside the cage body element and has a discharge opening; and a urine collection element including:
      a downspout projecting from the discharge opening in the drain floor of the excreta flushing element;
      a track supported within the cage body element beneath the excreta flushing element and arranged to extend from front to rear in underlying relation to the downspout; and
      a slide movable lengthwise on said track and having seating means for a urine sample receiver located at its rear end portion.

2. The invention defined in claim 1, to which is added an animal-supporting grating mounted removably in the cage directly above the funnel-like floor.

3. The invention defined in claim 2, to which is added an animal perch mounted in the cage at a sufficient height above the rear portion of the drain floor to provide temporary support for a confined animal during pan flushing operations.

4. The invention defined in claim 1, to which is added an animal perch mounted in the cage at a sufficient height above the rear portion of the drain floor to provide temporary support for a confined animal during pan flushing operations.

5. The invention defined in claim 1, wherein the downspout is rearwardly inclined.

References Cited in the file of this patent
UNITED STATES PATENTS

| | | |
|---|---|---|
| 861,882 | Noppel | July 30, 1907 |
| 1,813,329 | Supplee | July 7, 1931 |
| 2,026,334 | Wilkinson | Dec. 31, 1935 |
| 2,524,229 | Krueger | Oct. 3, 1950 |
| 2,626,387 | Berry | Jan. 20, 1953 |
| 2,661,800 | Reichenbach | Dec. 8, 1953 |